US011145057B2

(12) United States Patent
Itu et al.

(10) Patent No.: US 11,145,057 B2
(45) Date of Patent: Oct. 12, 2021

(54) ASSESSMENT OF COLLATERAL CORONARY ARTERIES

(71) Applicant: Siemens Healthcare GmbH, Erlangen (DE)

(72) Inventors: Lucian Mihai Itu, Brasov (RO); Tiziano Passerini, Plainsboro, NJ (US); Puneet Sharma, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 93 days.

(21) Appl. No.: 16/674,033

(22) Filed: Nov. 5, 2019

(65) Prior Publication Data

US 2021/0133961 A1    May 6, 2021

(51) Int. Cl.
*G06T 7/00* (2017.01)
*G06N 20/00* (2019.01)

(52) U.S. Cl.
CPC .......... *G06T 7/0012* (2013.01); *G06N 20/00* (2019.01); *G06T 2207/20081* (2013.01); *G06T 2207/20084* (2013.01); *G06T 2207/30048* (2013.01); *G06T 2207/30101* (2013.01)

(58) Field of Classification Search
None
See application file for complete search history.

(56) References Cited

U.S. PATENT DOCUMENTS

| 10,049,308 | B1 * | 8/2018 | Dhua | G06N 3/0472 |
| 2006/0084114 | A1 * | 4/2006 | Yeo | G01N 33/6893 435/7.1 |
| 2010/0092958 | A1 * | 4/2010 | Simons | G01N 33/6893 435/6.16 |
| 2016/0125597 | A1 * | 5/2016 | Bang | G01R 33/5635 600/419 |
| 2017/0175169 | A1 * | 6/2017 | Lee | G16H 50/20 |

FOREIGN PATENT DOCUMENTS

| WO | WO2016075331 A2 | 5/2016 | |
| WO | WO-2017076620 A1 * | 5/2017 | G06T 15/08 |

OTHER PUBLICATIONS

Seiler et al., "Coronary Collateral Quantitation in Patients With Coronary Artery Disease Using Intravascular Flow /elocity or Pressure Measurements", Journal of the American College of Cardiology, 1998, vol. 32, No. 5, pp. 1272-1279 (Year: 1998).*
Van Os HJA, Ramos LA, Hilbert A, et al. Predicting Outcome of Endovascular Treatment for Acute Ischemic Stroke: Potential Value of Machine Learning Algorithms. Front Neurol. 2018;9:784. Published Sep. 25, 2018. doi:10.3389/fneur.2018.00784 (Year: 2018).*

(Continued)

*Primary Examiner* — Vu Le
*Assistant Examiner* — Courtney Joan Nelson (57) ABSTRACT

Systems and methods are provided for assessing collateral circulation of a patient. Patient data of a patient is received. A collateral circulation score is computed based on the patient data using a trained machine learning network. The collateral circulation score represents functioning of collateral circulation of the patient. The collateral circulation score is output.

16 Claims, 6 Drawing Sheets

(56) References Cited

OTHER PUBLICATIONS

Pries et al., "Coronary Vascular Regulation, Remodelling, and Collateralization: Mechanisms and Clinical Implications on behalf of the Working Group on Coronary Pathophysiology and Microcirculation", European Heart Journal, 2015, vol. 36, No. 45, pp. 3134-3146.

Seiler et al., "Prognostic Relevance of Coronary Collateral Function: Confounded or Causal Relationship?", Heart, 2013, vol. 99, No. 19, pp. 1408-1414.

Elias et al., "Impact of Collateral Circulation on Survival in ST-Segment Elevation Myocardial Infarction Patients Undergoing Primary Percutaneous Coronary Intervention With a Concomitant Chronic Total Occlusion", Journal of the American College of Cardiology: Cardiovascular Interventions, 2017, vol. 10, No. 9, pp. 906-914.

Seiler et al., "Coronary Collateral Quantitation in Patients With Coronary Artery Disease Using Intravascular Flow Velocity or Pressure Measurements", Journal of the American College of Cardiology, 1998, vol. 32, No. 5, pp. 1272-1279.

Khand et al., "The Collateral Circulation of the Heart in Coronary Total Arterial Occlusions in Man: Systematic Review of Assessment and Pathophysiology", American Heart Journal, 2013, vol. 166, No. 6, pp. 941-952.

Fuchs et al., "Lack of Correlation Between Angiographic Grading of Collateral and Myocardial Perfusion and Function: Implications for the Assessment of Angiogenic Response", Coronary Artery Disease, 2001, vol. 12, No. 3, pp. 173-178.

Rentrop et al., "Changes in Collateral Channel Filling Immediately After Controlled Coronary Artery Occlusion by an Angioplasty Balloon in Human Subjects", Journal of the American College of Cardiology, 1985, vol. 5, No. 3., pp. 587-592.

Tayebjee et al., "Collateralization and the Response to Obstruction of Epicardial Coronary Arteries", QJ Med, 2004, vol. 97, No. 5, pp. 259-272.

Levin, "Pathways and Functional Significance of the Coronary Collateral Circulation", Circulation, 1974, vol. 50, No. 4, pp. 831-837.

Meier et al., "The Impact of the Coronary Collateral Circulation on Outcomes in Patients with Acute Coronary Syndromes: Results from the ACUITY Trial", Heart, 2014, vol. 100, No. 8, pp. 647-651.

Duran et al., "The PLAU P141L Single Nucleotide Polymorphism is Associated with Collateral Circulation in Patients with Coronary Artery Disease", Rev Esp Cardiol., 2014, vol. 67, No. 7, pp. 552-557.

Seiler et al., "Washout Collaterometry: A New Method of Assessing Collaterals using Angiographic Contrast Clearance During Coronary Occlusion", Heart, 2001, vol. 86, No. 5, pp. 540-546.

Werner et al., "Direct Assessment of Coronary Steal and Associated Changes of Collateral Hemodynamics in Chronic Total Coronary Occlusions", Circulation, 2002, vol. 106, No. 4, pp. 435-440.

Kazemi et al., "Style and Content Disentanglement in Generative Adversarial Networks", https://arxiv.org/pdf/1811.05621.pdf., Nov. 14, 2018, 9 pgs.

Chen et al., "InfoGAN: Interpretable Representation Learning by Information Maximizing Generative Adversarial Nets", https://arxiv.org/abs/1606.03657v1, Jun. 12, 2016, 14 pgs.

Ajayi et al., "The Role of Coronary Artery Collaterals in the Preservation of Left Ventricular Function: A Study to Address a Longstanding Controversy", CVJ Africa Cardiovascular Journal of Africa, 2017, vol. 28, No. 2, pp. 81-85.

Jurcut et al., "Coarctation of the Aorta in Adults: What is the Best Treatment? Case Report and Literature Review", Journal of Medicine and Life, 2011, vol. 4, No. 2, pp. 189-195.

Moutinho et al., "Coarctation of the Aorta and the Nature of Collateral Circulation", Journal of Vascular Surgery Cases and Innovative Techologies, 2018, pp. 339-340.

Arora et al., "Spectrum of Hepatofugal Collateral Pathways in Portal Hypertension: An Illustrated Radiological Review", Insights Imaging, 2015, vol. 6, pp. 559-572.

Grollman et al., "The Collateral Circulation in Coarctation of the Aorta with a Distal Subclavian Artery", Radiology, 1964, vol. 83, pp. 622-625.

Im et al., "Collateral Vessels in Branch Retinal Vein Occlusion", Korean J Ophthalmol, 2002, vol. 16, pp. 82-87.

Choi J. et. al., "Noninvasive Evaluation of Coronary Collateral Arterial Flow by Coronary Computed Tomographic Angiography", Circ Cardiovasc Imaging, pp. 483-490, 2014.

Extended European Search Report (EESR) dated Mar. 22, 2021 in corresponding European Patent Application No. 20205950.7.

Tong, et al. "Time-resolved CT assessment of collaterals as imaging biomarkers to predict clinical outcomes in acute ischemic stroke." Neuroradiology 59.11 (2017): 1101-1109.

Xiao, et al: "Towards Automatic Collateral Circulation Score Evaluation in Ischemic Stroke Using Image Decompositions and Support Vector Machines;" Springer International Publishing AG 2017; pp. 158-167.

* cited by examiner

ASSESSMENT OF COLLATERAL CORONARY ARTERIES

TECHNICAL FIELD

The present invention relates generally to the assessment of collateral coronary arteries, and more particularly to training and applying a machine learning model for the assessment of collateral coronary arteries.

BACKGROUND

Coronary artery disease (CAD) is the narrowing of the coronary arteries due to the buildup of plaque, thereby obstructing blood flow to myocardial territories of the heart. In some patients, when blood flow through a native coronary artery to a myocardial territory is obstructed due to CAD, collateral arteries enlarge to provide an alternate path for blood flow to that myocardial territory, thereby bypassing the obstruction. Collateral arteries may be pre-existing collateral vessels that are relatively small and are not typically functional under normal conditions, or may be newly formed collateral vessels formed between adjacent blood vessels. Such formation of collateral vessels may be initiated by a pathological condition, which may develop over time or may be congenital. Studies have demonstrated that well-functioning coronary collateral circulation of a patient independently predicts lowered mortality in the patient with chronic CAD and acute CAD. The protective effects provided by such collateral arteries results in improved left ventricular function (e.g., higher ejection fraction), decreased remodeling, and a lower risk of arrhythmias.

In one conventional approach, collateral arteries are functionally assessed using invasively acquired pressure and/or velocity measurements. Such functional assessment of collateral arteries can be represented by the pressure derived collateral flow index, collateral pressure index, collateral resistance index, and collateral velocity flow reserve. However, such conventional approaches for the functional assessment of collateral arteries cannot practically be used in routine clinical practice due to the associated costs and risks.

Other conventional approaches provide for a functional assessment of collateral arteries from coronary angiography using a surrogate measure, such as, e.g., Rentrop grading, collateral frame count, and collateral flow grade. However, such conventional approaches for the surrogate functional assessment of collateral arteries also cannot practically be used in routine clinical practice since they are time-consuming and rely on manually performed annotations and observations.

In still other conventional approaches, collateral arteries are anatomically assessed by measuring the size or length of the collateral arteries, the recipient artery, and the donor artery, by determining a bifurcation count grade, etc. However, studies have not been able to confirm the benefits of such an anatomical assessment of collateral arteries with respect to clinical outcomes in patients.

BRIEF SUMMARY OF THE INVENTION

In accordance with one or more embodiments, systems and methods are provided for assessing collateral circulation of a patient. Patient data of a patient is received. A collateral circulation score is computed based on the patient data using a trained machine learning network. The collateral circulation score represents functioning of collateral circulation of the patient. The collateral circulation score is output.

In one embodiment, the patient data includes one or more medical images of a collateral artery of the patient, demographic information of the patient, results of a lab test for the patient, and results of a genetic test for the patient. The collateral circulation score may be computed based on results of an anatomical assessment of the collateral artery performed on the one or more medical images, or based on results of a functional assessment of the collateral artery performed on the one or more medical images. The results of the functional assessment of the collateral artery may include at least one of a virtual collateral flow index, a collateral pressure index, a collateral resistance index, or a collateral velocity flow reserve. The virtual collateral flow index may be computed using another trained machine learning network. The results of the functional assessment of the collateral artery may also include at least one of a microvascular blush grade, a virtual washout collaterometry, a Rentrop grading, a collateral frame count, or a collateral flow grade. In one embodiment, a synthesized image without the collateral artery is generated from the one or more medical images of the collateral artery using a generative adversarial network.

In one embodiment, the trained machine learning network is trained using synthesized images of collateral arteries generated using a generative adversarial network. A clinical decision or a likelihood of cardiovascular disease related events may be determined using the trained machine learning network.

These and other advantages of the invention will be apparent to those of ordinary skill in the art by reference to the following detailed description and the accompanying drawings.

DETAILED DESCRIPTION

The present invention generally relates to the assessment of collateral coronary arteries. Embodiments of the present invention are described herein to give a visual understanding of methods for the assessment of collateral coronary arteries. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Further, it should be understood that while embodiments of the present invention may be described with respect to the assessment of collateral coronary arteries of a patient for coronary artery disease (CAD), the present invention is not so limited. Embodiment of the present invention may be applied for the assessment of any vessel for any disease. In one example, embodiments of the present invention may be applied to assess collateral circulation for coarctation of the aorta (CoA). CoA is a congenital cardiac defect usually consisting of a discrete shelf-like narrowing of the aortic media into the lumen of the aorta, and may occur in some patients with congenital heart disease. Collateral circulation may develop in the presence of severe CoA. In another example, embodiments of the present invention may be applied to assess neovascularization restoring blood flow to the retina after central retinal vein occlusion. The newly formed vessels represent a risk for acute glaucoma by blocking the drainage of aqueous humour. In another example, embodiments of the present invention may be applied to assess collateral circulation from hepatic cirrhosis. Hepatic cirrhosis arising from congestion in the hepatic portal vein may give rise to collateral circulation between branches of the portal and caval veins of the liver, or between the two caval veins. Consequences of newly established venous collaterals arising from portal hypertension include esophageal varices and hemorrhoids (portocaval collateral circulation). Other applications of embodiments of the present invention for assessing various types of collaterals (e.g., in the cardiovascular system) are also contemplated.

Figure 1:
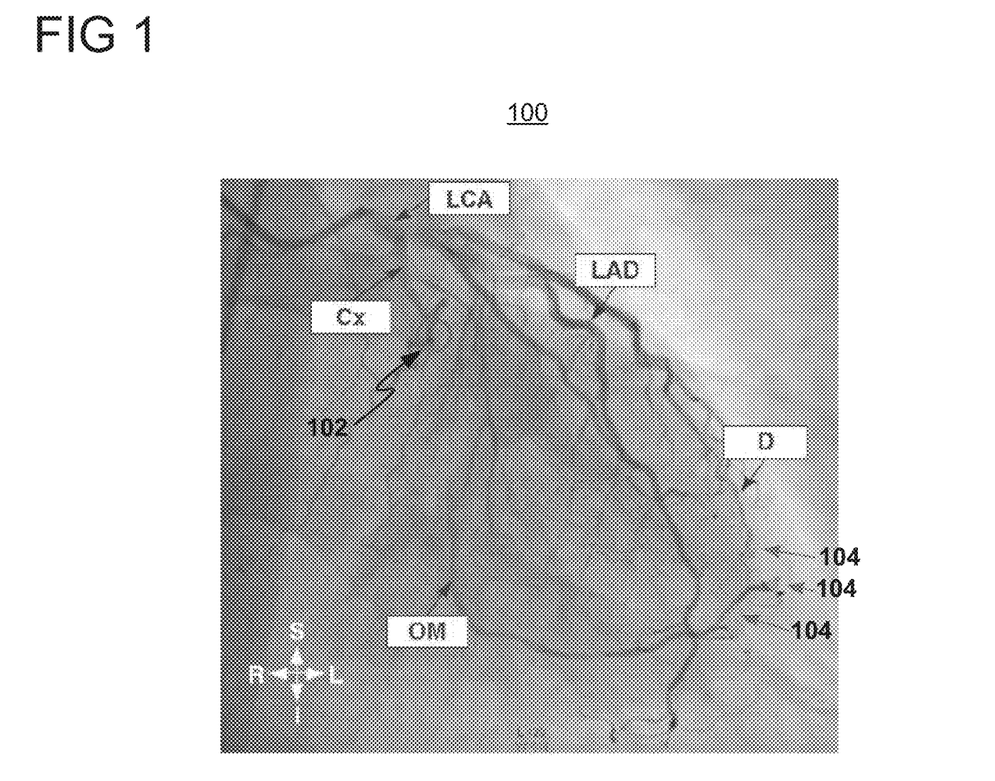
FIG. 1 shows an exemplary angiography image of a heart of a patient.

FIG. 1 shows an exemplary angiography image 100 of a heart of a patient. Angiography image 100 depicts the left coronary artery (LCA), the circumflex artery (Cx), the left anterior descending artery (LAD), the obtuse marginal artery (OM), and a diagonal artery (D). As shown in FIG. 1, the Cx artery has an obstruction 102 limiting blood blow to the OM artery. Obstruction 102 may be a result of CAD. Due to obstruction 102 in the Cx artery, collateral arteries 104 enlarge to enable blood flow to the OM artery from the diagonal branch of the LAD artery, thereby bypassing obstruction 102 in the Cx artery.

Clinical studies have demonstrated that well-functioning collateral arteries 104 independently predicts lowered mortality in patients with chronic and acute CAD. Advantageously, embodiments of the invention provide for an artificial intelligence based approach to automatically extract and quantify collateral circulation related features from routine medical exams (e.g., coronary angiography exams). Such collateral circulation related features, combined with other clinical biomarkers, can result in improved CAD patient stratification.

Figure 2:
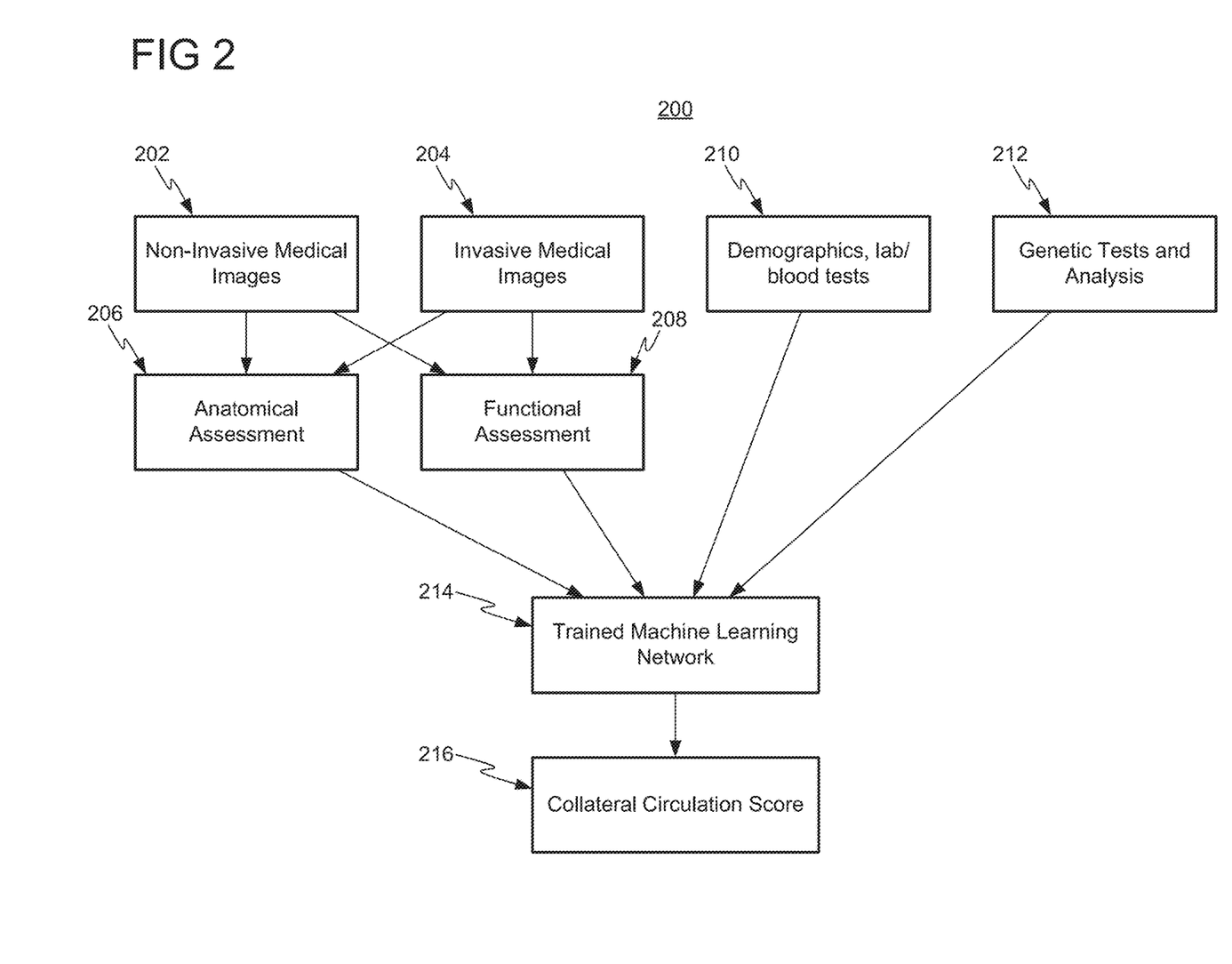
FIG. 2 shows a high-level workflow for assessing collateral circulation of a patient.

FIG. 2 shows a high-level workflow 200 for assessing collateral circulation of a patient, in accordance with one or more embodiments. In workflow 200, trained machine learning network 214 receives various patient data of a patient to predict a collateral circulation score 216. The patient data may include, for example, one or more of non-invasive medical images 202, invasive medical images 204 (e.g., coronary angiography), demographics and lab/blood test results 210, and genetic tests and analysis 212. In one embodiment, an anatomical assessment 206 and/or a functional assessment 208 of collateral arteries in non-invasive medical images 202 and/or invasive medical images 204 may be performed. Anatomical assessment 206 of collateral arteries may include assessment of the anatomy relating to the collateral arteries by, e.g., identifying and labelling the collateral arteries, determining measurements of coronary arteries, etc. Functional assessment 208 of collateral arteries may include assessment of the function of the collateral arteries by determining indices or surrogate measures. The results of anatomical assessment 206 and functional assessment 208 is input into trained machine learning network 214. Trained machine learning network 214 outputs collateral circulation score 216 representing the functioning of collateral circulation in the patient. Since well-functioning collateral circulation correlates to lowered mortality for CAD, collateral circulation score also represents the risk to the patient to CAD.

Figure 3:
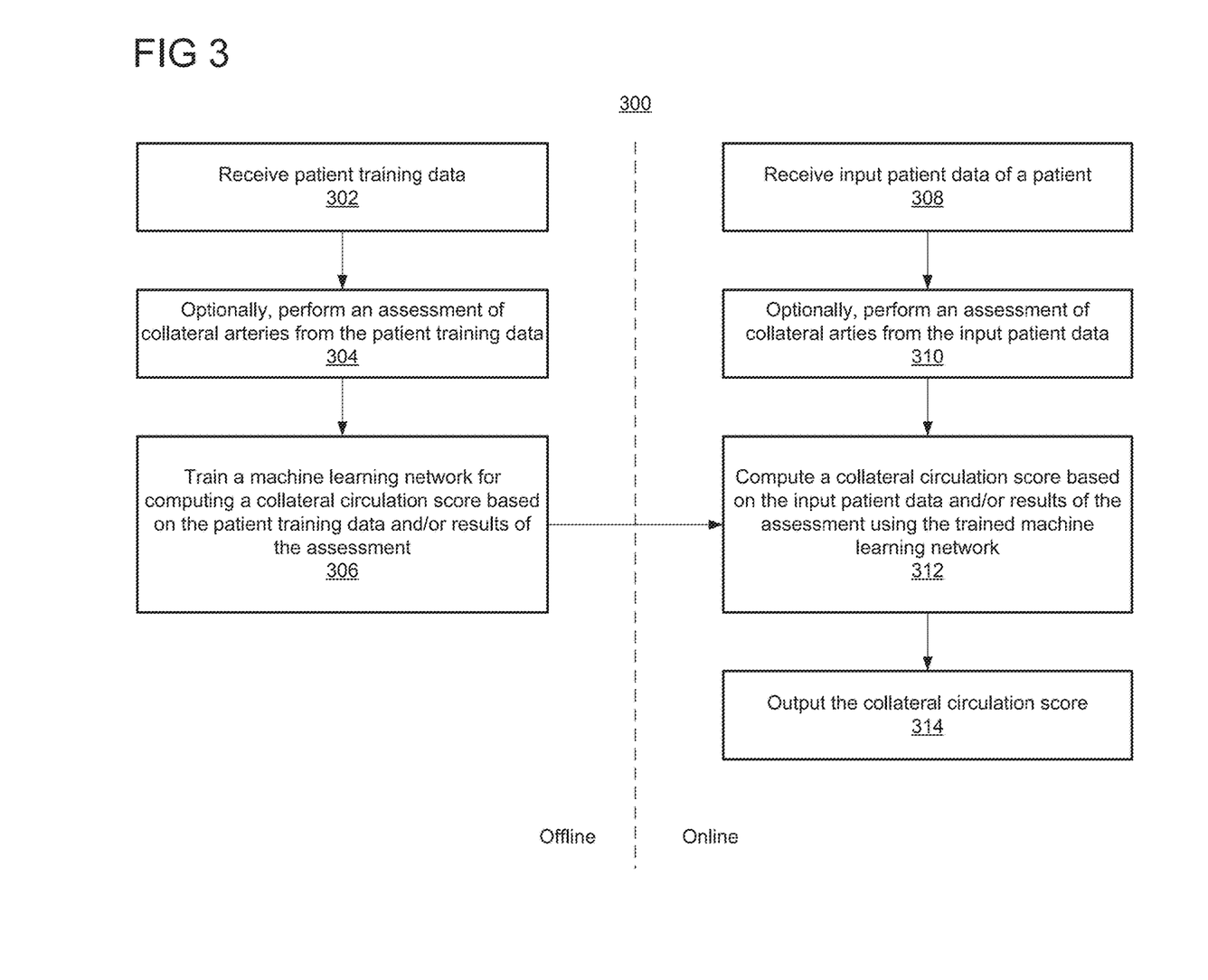
FIG. 3 shows a workflow for training and applying a machine learning network for assessing collateral circulation of a patient.

FIG. 3 shows a workflow 300 for training and applying a machine learning network for assessing collateral circulation of a patient, in accordance with one or more embodiments. Workflow 300 may be performed by any suitable computing device, such as, e.g., computer 602 of FIG. 6. Blocks 302-306 show an offline or training stage for training a machine learning model for assessing collateral circulation of a patient. Blocks 308-314 show an online or testing stage for applying the trained machine learning model. In one or more embodiments, the trained machine learning model trained according to blocks 302-306 may be the trained machine learning network 214 applied in FIG. 2, and the trained machine learning network 214 determines the collateral circulation score 216 according to blocks 308-304.

During an offline stage, at block 302, patient training data is received. The patient training data may include any suitable patient data that is indicative of collateral circulation of the patient. For example, the patient training data may include one or more of medical images of collateral arteries, demographic information (e.g., gender, age, race, etc.), lab/blood test results, and genetic tests and analysis. In one embodiment, the patient training data comprises a database of patient-specific datasets with corresponding long-term outcome data. In one embodiment, the patient training data comprises synthesized medical images generated according to workflow 400 of FIG. 4.

The medical images of the collateral arteries may be of any suitable modality. For instance, the medical images may be non-invasive medical images, such as, e.g., coronary computed tomography angiography (CCTA), cardiac magnetic resonance imaging (CMR), etc. The medical images may also be invasive medical images, such as, e.g., coronary angiography, etc. Coronary angiography is typically performed for patients with chronic total occlusion (CTO) or acute CAD with severe stenoses, but may be performed for patients of other types of CAD. The medical images may be received directly from an image acquisition device (e.g., image acquisition device 614 of FIG. 6) used to acquire the medical images. Alternatively, the medical images may be received by loading previously acquired medical images from a storage or memory of a computer system or receiving medical images that have been transmitted from a remote computer system.

The genetic tests and analysis may include, e.g., gene expressions, molecular analysis and modelling, microRNA, etc. Clinical research has identified a correlation between genes and the development of well-functioning coronary collateral circulation.

At block 304, an assessment of collateral arteries is optionally performed from the patient training data. In one embodiment, the assessment of the collateral arteries is performed on the medical images of the collateral arteries from the patient training data. The assessment of the collateral arteries may include an anatomical assessment and/or a functional assessment, and may be performed automatically, e.g., using known techniques, or manually by a user (e.g., clinician).

The anatomical assessment of the collateral arteries on the medical images may include, for example, the identification and labelling of the collateral arteries and pathways, measurements (e.g., diameter, length, tortuosity, etc.) of the collateral arteries, the assessment (e.g., number of stenosis, severity of stenosis, etc.) of donor coronary arteries, the assessment (e.g., number of stenosis, severity of stenosis, etc.) of the receiving coronary artery, and the number of bifurcations distal to the collateral anastomoses.

A functional assessment of the collateral arteries may be performed using invasively acquired measurements (e.g., pressure or velocity). However, such invasive functional assessment of the collateral arteries is a costly, time consuming, and risky procedure. In one embodiment, a virtual functional assessment of the collateral arteries may be performed on the medical images. The virtual functional assessment of the collateral arteries may be based on a non-invasive computation of functional indices or a non-invasive determination of surrogate measures of the collateral arteries.

In one embodiment, the functional indices for performing a virtual functional assessment of collateral arteries includes a virtual collateral flow index (vCFI). The vCFI may be non-invasively computed by automatically segmenting and reconstructing the coronary arterial anatomy (including collateral arteries) from the medical images, computing blood flow under CTO and virtual balloon occlusion, and computing the vCFI based on the blood flows. In one embodiment, the vCFI is computed using a trained machine learning network trained and applied according to workflow 500 of FIG. 5. The goal is not necessarily to determine a vCFI value identical to a measured CFI value, since very small collateral arteries may be present which may not be visible in the medical images, the microvascular state is not precisely known, etc. However, the vCFI could be an important input feature for the assessment of collateral circulation. Other indices may also be computed to functionally assess the collateral arteries, such as, e.g., collateral pressure index, collateral resistance index, collateral velocity flow reserve, etc.

In one embodiment, the surrogate measure may be the automated microvascular blush grade. As noted above, very small collateral arteries may not be visible in the medical images. However, the effect of collateral arteries may still be assessed by analyzing the microvascular blush grade following a contrast injection. In other embodiments, the surrogate measure may be a virtual washout collaterometry. The virtual washout collaterometry may be measured as the number of heart beats counted until approximately half the length of the epicardial vessel is cleared of contrast. The virtual washout collaterometry may be performed in a reconstructed anatomical model using computational fluid dynamics (to simulate blood flow and contrast agent propagation). Other surrogate measures may include, for example, an automated Rentrop grading (assessing the filling of the recipient artery), collateral frame count, collateral flow grade, or any other measure extracted from contrast agent propagation in the coronary circulation.

At step 306, a machine learning network is trained for computing (or predicting) a collateral circulation score based on the patient training data and/or results of the assessment. The machine learning network may be any suitable machine learning network, such as, e.g., a neural network. The collateral circulation score represents the functioning of the collateral circulation of a patient. The collateral circulation score may be a number, percentage, label (e.g., low, medium, or high), or in any other suitable form. In one example, the collateral circulation score is a value between 0 and 1, where a lower collateral circulation score represents that collateral circulation of a patient is well-functioning (and therefore the patient is at a lower risk for CAD) and a higher collateral circulation score represents that collateral circulation of the patient is not well-functioning (and therefore the patient is at a higher risk for CAD).

In one embodiment, the machine learning network may be trained to predict a clinical decision. For example, the clinical decision may be whether or not to perform percutaneous coronary intervention (PCI) and if so the type and location of stent for the PCI, whether or not to perform coronary artery bypass grafting (CABG), the optimal medical treatment, etc. In another embodiment, the machine learning network may be trained to directly predict the likelihood of cardiovascular disease related events, such as, e.g., myocardial infarction (and the type), arrhythmia, etc.

During an online stage, at block 308, input patient data of a patient is received. The input patient data of the patient may be similar to the patient training data received at block 302 during the training phase. In particular, the input patient data of the patient may include one or more of medical images of collateral arteries of the patient, demographic information of the patient, lab/blood test results of the patient, and genetic tests and analysis of the patient. The medical images may be received directly from an image acquisition device (e.g., image acquisition device 614 of FIG. 6) used to acquire the medical images. Alternatively, the medical images may be received by loading previously acquired medical images from a storage or memory of a computer system or receiving medical images that have been transmitted from a remote computer system.

At block 310, an assessment of collateral arteries is optionally performed from the input patient data. The assessment of the collateral arteries may be an anatomical and/or functional assessment of the collateral arteries from the medical images of the input patient data, as described with respect to block 304.

At block 312, a collateral circulation score is computed based on the input patient data and/or results of the assessment using the trained machine learning network. In one embodiment, the trained machine learning network may additionally or alternatively determine a clinical decision and/or the likelihood of cardiovascular disease related events.

At block 314, the collateral circulation score is output. For example, the collateral circulation score can be output by displaying the collateral circulation score on a display device of a computer system, storing the collateral circulation score on a memory or storage of a computer system, or by transmitting the collateral circulation score to a remote computer system. The clinical decision and/or the likelihood of cardiovascular disease related events (if computed at block 312) may be similarly output.

It should be understood that once the trained artificial intelligence model is trained in the training stage (blocks 302-306), the online stage (blocks 308-314) can be repeated for each newly received input patient data to predict a collateral circulation score for the newly received input patient data.

Figure 4:
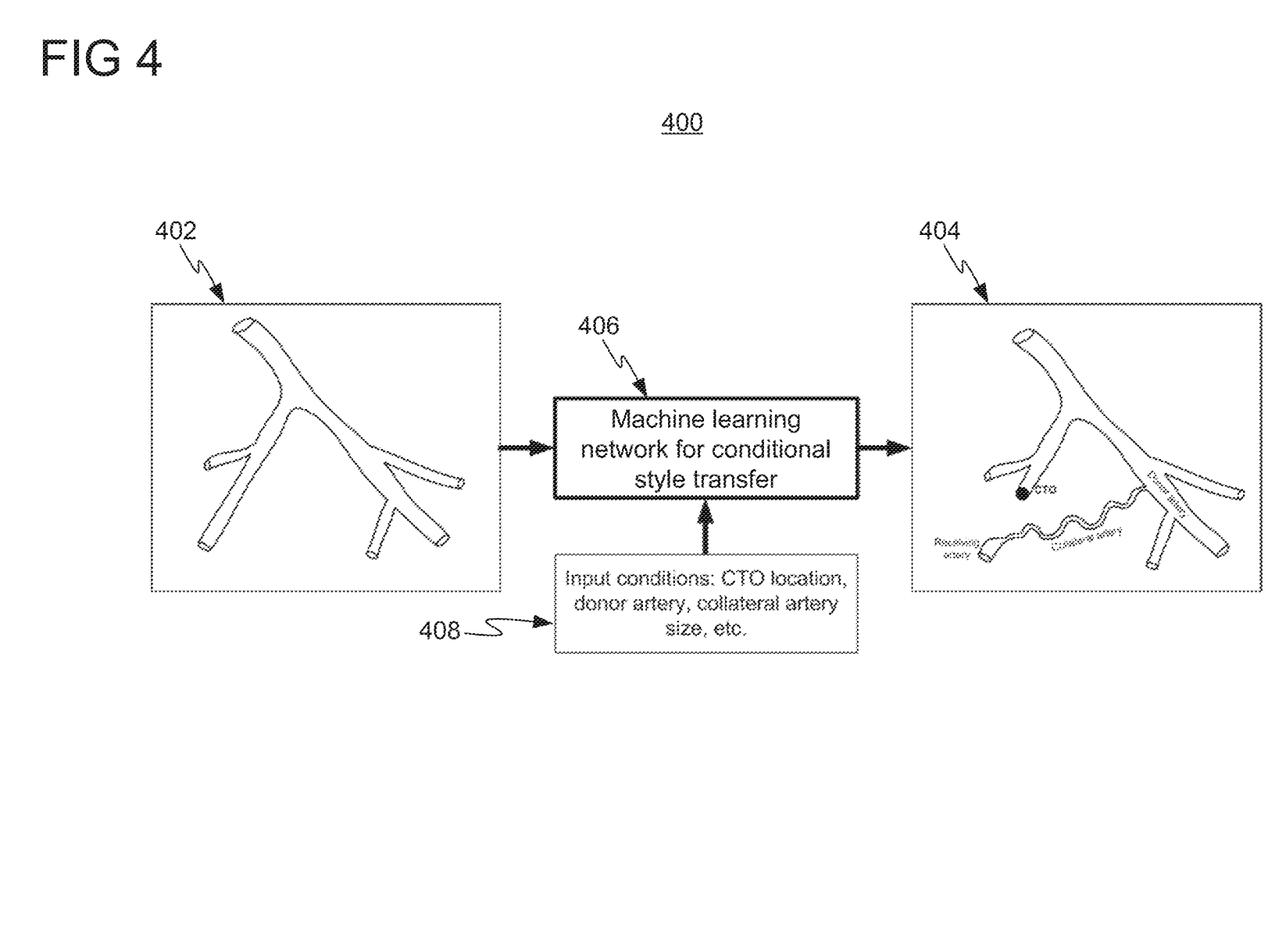
FIG. 4 shows a workflow for generating synthesized images of collateral arteries.

FIG. 4 shows a workflow 400 for generating synthesized images of collateral arteries, in accordance with one or more embodiments. Typically, the number of coronary medial images (e.g., coronary angiographies) depicting collateral arteries in a dataset is much smaller than the total number of coronary medical images. Advantageously, synthesized images of collateral arteries may be generated according to workflow 400 to augment the dataset with the synthesized images and associated effects (e.g., CTO). Workflow 400 is a machine learning based approach for conditional style transfer to control the augmentation process (e.g., to define the location of CTO, to define the donor and receiving arties for the collateral arteries, to define the size of the collateral arteries, etc.). Workflow 400 may be performed by any suitable computing device, such as, e.g., computer 602 of FIG. 6. In one embodiment, the patient training data received at block 302 of FIG. 3 may include the synthesized images of collateral arteries generated according to workflow 400.

As shown in workflow 400, a machine learning network 406 for conditional style transfer receives as input an initial medical image 402 depicting a coronary artery tree and input conditions 408 and generates synthesized medical image 404 depicting one or more synthesized collateral arteries. Machine learning network 406 may be any suitable machine learning network for conditional style transfer. In one embodiment, machine learning network 406 is an infoGAN (information-theoretic extension to the Generative Adversarial Network). Initial medical image 402 depicts a coronary arterial tree. Initial medical image 402 may be of any suitable modality, but in one embodiment is a coronary angiography. Input conditions 408 are input by a user (e.g., clinician) to define conditions of the synthesized medical image. The input conditions 408 may define, for example, the location of CTO, the donor and receiving arties for the collateral arteries, the size of the collateral arteries, or any other suitable condition.

Synthesized medical image 404 may be a static image or a dynamic image. The static image is a single frame with well contrasted arteries. The dynamic image comprises multiple frames depicting the propagation of contrast agent and the filling of receiving coronary artery with blood via the synthesized collateral artery. In one embodiment, the dynamic image is generated using machine learning network 406 and computational fluid dynamics (CFD). Accordingly, a machine learning network is employed to determine the modified anatomical configuration after the introduction of the collateral artery, and a CFD based model is employed to simulate the propagation of the contrast agent and the filling of the receiving artery in the modified anatomical configuration.

In one embodiment, workflow 400 may be reversed so that the machine learning network generates a synthesized medical image of a coronary artery tree without a collateral artery from an initial medical image with a collateral artery. Accordingly, the synthesized medical image of a coronary artery tree without a collateral artery represents the state of the coronary artery before development of the severe coronary stenosis or CTO. The machine learning network may apply the style transfer based on the initial medical image or based on anatomical models reconstructed from the initial medical image. The resulting paired dataset may be employed for qualitative analysis to allow clinicians to visualize the original coronary arterial tree in parallel to the currently observed coronary arterial tree (with collateral arteries) and for quantitative analysis to compare the functional status before and after the appearance for the collateral artery. The quantitative analysis allows for the quantitative assessment of the perfusion of the various myocardial territories, enabling a quantification of the effect of the CTO or of the severe stenosis leading to the development of the collateral artery.

In some embodiment, workflow 400 may be reversed to remove the collateral artery from an initial medical image without artificially restoring the receiving artery. This may allow for a quantitative assessment of the perfusion of the various myocardial territories, with and without the collateral arteries, enabling a quantification of the beneficial effect of the collateral arteries.

Figure 5:
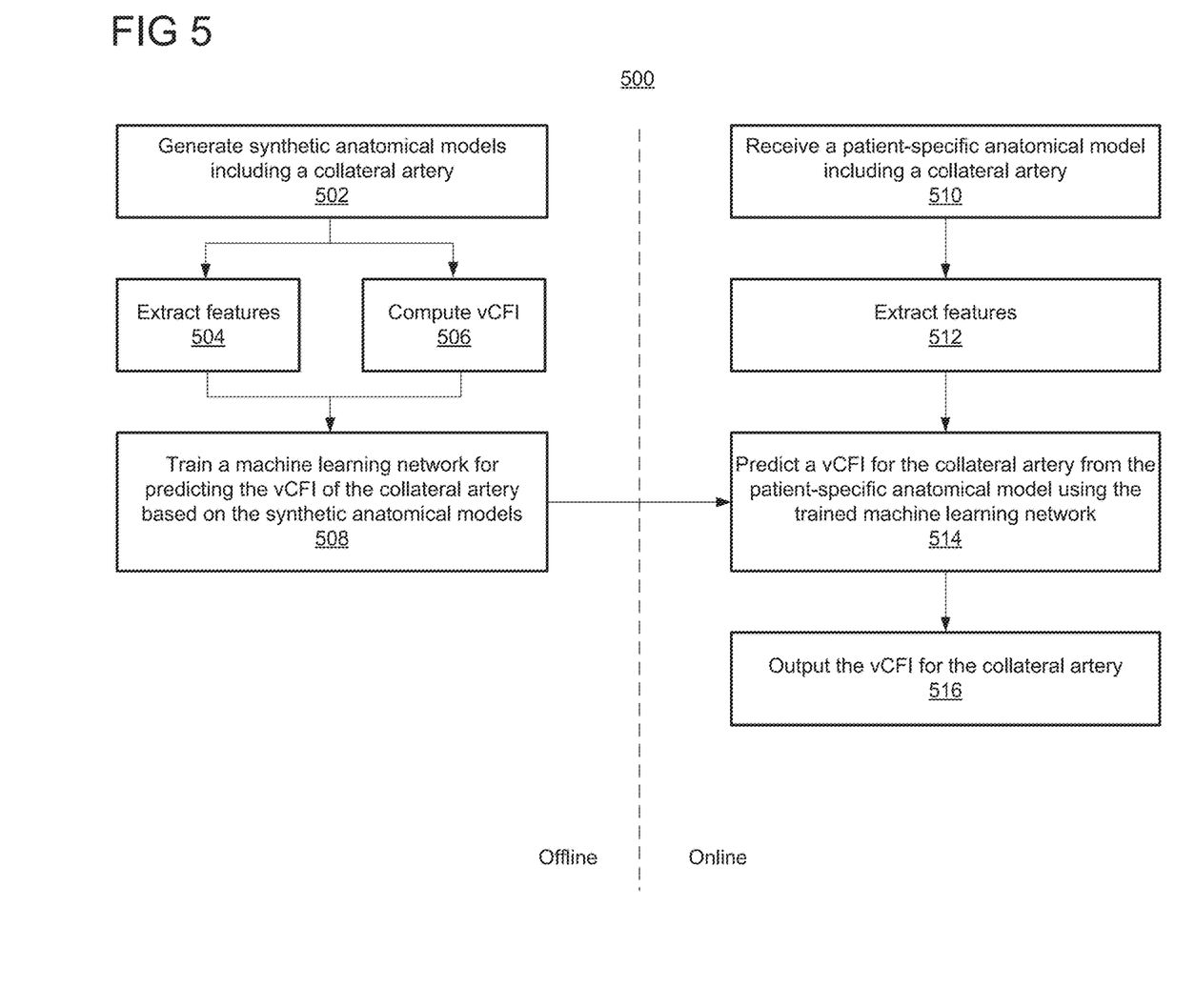
FIG. 5 shows a workflow for training and applying a machine learning network for computing a virtual collateral flow index of a collateral artery.

FIG. 5 shows a workflow 500 for training and applying a machine learning network for computing a vCFI of a collateral artery, in accordance with one or more embodiments. Workflow 500 may be performed by any suitable computing device, such as, e.g., computer 602 of FIG. 6. Blocks 502-508 show an offline or training stage for training a machine learning model for computing a vCFI of a collateral artery. Blocks 510-516 show an online or testing stage for applying the trained machine learning model for computing the vCFI fully automatically (without requiring user intervention). In one or more embodiments, the trained machine learning model trained according to blocks 502-508 may be applied to compute the vCFI at blocks 304 and 310 of FIG. 3.

The CFI is calculated according to Equation 1 below.

$$CFI = \frac{P_d - P_w}{P_a - P_w} \quad \text{(Equation 1)}$$

where Pa is the aortic pressure, Pd is the pressure distal to the stenosis, and Pw is the wedge pressure. The wedge pressure is the pressure recorded distal to a stenosis while an inflated balloon occludes the coronary artery during angioplasty. This pressure has been shown to reflect actual (visible) and potential (recruitable) collateral flow to the stenosed artery, distal to the angioplasty site. Typically, the vCFI is computed using a CFD based approach using Equation 1. However, in an intra-operatory setting where real time evaluation is required, the CFD based approach for computing vCFI may require runtimes that are too long. Workflow 500 provides for a machine learning based approached for computing a vCFI of a collateral artery with a faster runtime than the CFD based approach.

During an offline stage, at block 502, synthetic anatomical models are generated. The synthetic anatomical models are of a coronary tree with at least one collateral artery. In one embodiment, the synthetic anatomical models may be generated using workflow 400 of FIG. 4. At block 504, features of interest are extracted from the synthetic anatomical models. At block 506, a vCFI is computed for the collateral artery in the synthetic anatomical models using Equation 1. At block 508, a machine learning network is trained for predicting the vCFI of the collateral artery based on the synthetic anatomical models. The machine learning network may be any suitable machine learning network, such as, e.g., a neural network.

During an online stage, at block 510, a patient-specific anatomical model (e.g., lumen segmentation) including a collateral artery is received. The patient-specific anatomical model may be generated (e.g., fully automatically or semi-automatically) during a pre-processing stage. At block 512, features of interest are extracted from the patient-specific anatomical model. At block 514, a vCFI is predicted for the collateral artery from the patient-specific anatomical model using the trained machine learning network. At block 516, the vCFI for the collateral artery is output.

Advantageously, by using synthetic data for training the machine learning network, a very large number of cases can be automatically generated leading to an extensive training database, complex pathological configurations can be generated, the cost of generating a large database is reduced since the generation of synthetic in silico geometries can be completely automated, rare pathological cases can be better sampled, the training database can be easily extended to different demographic groups, and the training can be iteratively improved with more data or better representations of the features.

While workflow 500 is described for computing a vCFI, it should be understood that workflow 500 may be modified for computing other indices (e.g., collateral pressure index, collateral resistance index, collateral velocity flow reserve, etc.) for the virtual functional assessment of a collateral artery.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 2-5. Certain steps or functions of the methods and workflows described herein, including one or more of the steps or functions of FIGS. 2-5, may be performed by a server or by another processor in a network-based cloud-computing system. Certain steps or functions of the methods and workflows described herein, including one or more of the steps of FIGS. 2-5, may be performed by a client computer in a network-based cloud computing system. The steps or functions of the methods and workflows described herein, including one or more of the steps of FIGS. 2-5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 2-5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
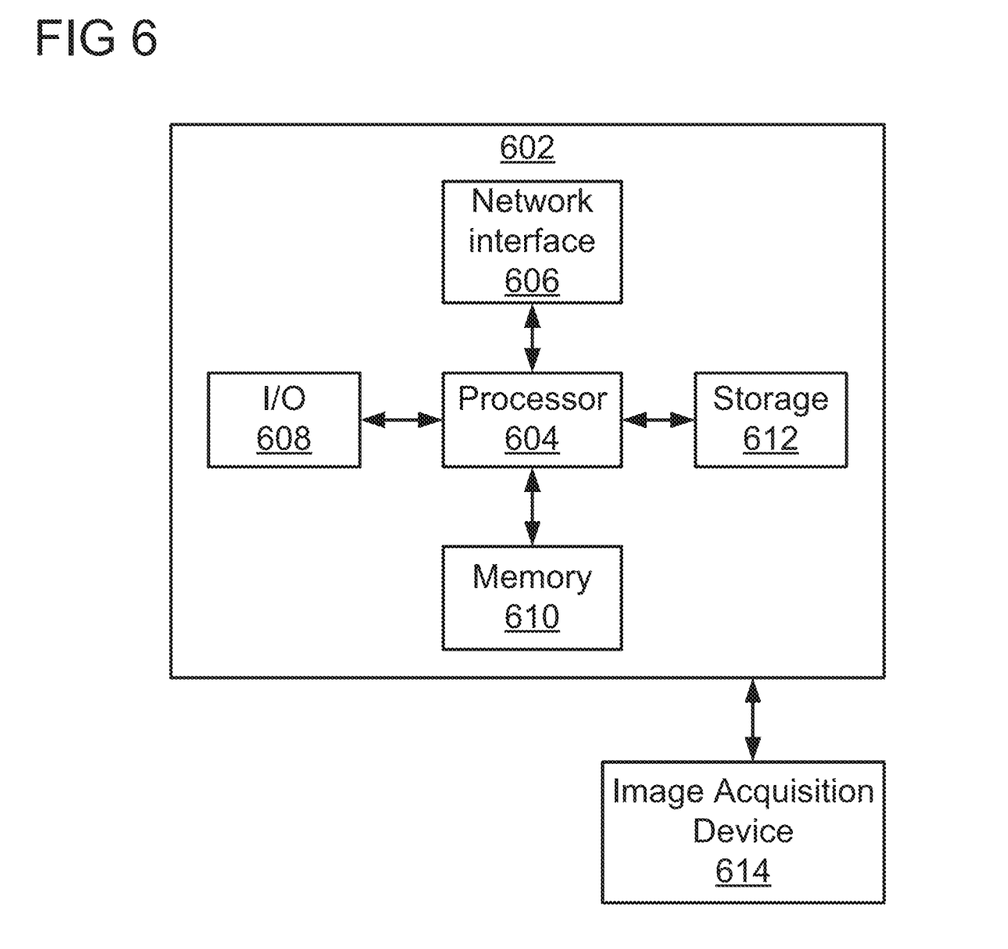
FIG. 6 shows a high-level block diagram of a computer.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 2-5 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 2-5. Accordingly, by executing the computer program instructions, the processor 604 executes the method and workflow steps or functions of FIGS. 2-5. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD)

monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for assessing collateral circulation of a patient, comprising:
   receiving patient data of a patient, the patient data comprising one or more medical images of a collateral artery of the patient;
   performing an anatomical assessment of the collateral artery based on the one or more medical images;
   performing a functional assessment of the collateral artery based on the one or more medical images;
   computing a collateral circulation score representing functioning of collateral circulation of the patient using a trained machine learning network, the trained machine learning network receiving as input the patient data, results of the anatomical assessment, and results of the functional assessment and generating as output the collateral circulation score; and
   outputting the collateral circulation score.

2. The method of claim 1, wherein the results of the functional assessment of the collateral artery comprises at least one of a virtual collateral flow index, a collateral pressure index, a collateral resistance index, or a collateral velocity flow reserve.

3. The method of claim 2, further comprising:
   computing the virtual collateral flow index using another trained machine learning network.

4. The method of claim 1, wherein the results of the functional assessment of the collateral artery comprises at least one of a microvascular blush grade, a virtual washout collaterometry, a Rentrop grading, a collateral frame count, or a collateral flow grade.

5. The method of claim 1, further comprising:
   training the trained machine learning network using synthesized images of collateral arteries generated using a generative adversarial network.

6. The method of claim 1, wherein the patient data comprises one or more medical images of a collateral artery of the patient, the method further comprising:
   generating a synthesized image without the collateral artery from the one or more medical images of the collateral artery using a generative adversarial network.

7. The method of claim 1, further comprising:
   determining a clinical decision using the trained machine learning network.

8. The method of claim 1, further comprising:
   determining a likelihood of cardiovascular disease related events using the trained machine learning network.

9. The method of claim 1, wherein the patient data comprises one or more of demographic information of the patient, results of a lab test for the patient, and results of a genetic test for the patient.

10. An apparatus for assessing collateral circulation of a patient, comprising:
    means for receiving patient data of a patient, the patient data comprising one or more medical images of a collateral artery of the patient;
    means for performing an anatomical assessment of the collateral artery based on the one or more medical images;
    means for performing a functional assessment of the collateral artery based on the one or more medical images;
    means for computing a collateral circulation score representing functioning of collateral circulation of the patient using a trained machine learning network, the trained machine learning network receiving as input the patient data, results of the anatomical assessment, and results of the functional assessment and generating as output the collateral circulation score; and
    means for outputting the collateral circulation score.

11. The apparatus of claim 10, wherein the results of the functional assessment of the collateral artery comprises at least one of a virtual collateral flow index, a collateral pressure index, a collateral resistance index, or a collateral velocity flow reserve.

12. The apparatus of claim 11, further comprising:
    means for computing the virtual collateral flow index using another trained machine learning network.

13. A non-transitory computer readable medium storing computer program instructions for assessing collateral circulation of a patient, the computer program instructions when executed by a processor cause the processor to perform operations comprising:
    receiving patient data of a patient, the patient data comprising one or more medical images of a collateral artery of the patient;
    performing an anatomical assessment of the collateral artery based on the one or more medical images;
    performing a functional assessment of the collateral artery based on the one or more medical images;
    computing a collateral circulation score representing functioning of collateral circulation of the patient using a trained machine learning network, the trained machine learning network receiving as input the patient data, results of the anatomical assessment, and results of the functional assessment and generating as output the collateral circulation score; and
    outputting the collateral circulation score.

14. The non-transitory computer readable medium of claim 13, the operations further comprising:
   training the trained machine learning network using synthesized images of collateral arteries generated using a generative adversarial network.

15. The non-transitory computer readable medium of claim 13, wherein the patient data comprises one or more medical images of a collateral artery of the patient, the operations further comprising:
   generating a synthesized image without the collateral artery from the one or more medical images of the collateral artery using a generative adversarial network.

16. The non-transitory computer readable medium of claim 13, wherein the patient data comprises one or more of demographic information of the patient, results of a lab test for the patient, and results of a genetic test for the patient.

* * * * *